United States Patent [19]

Chen

[11] Patent Number: 4,699,113
[45] Date of Patent: Oct. 13, 1987

[54] AIR-RICH FUEL SAVER

[76] Inventor: Teh-Chih Chen, No. 3, Lane 27, Wen-Hua Street, Tou-Nan Chen, Yin-Lin Hsien, Taiwan

[21] Appl. No.: 918,761

[22] Filed: Oct. 14, 1986

[51] Int. Cl.[4] ............... F02M 23/04; F02B 47/08
[52] U.S. Cl. .......................... 123/568; 123/587
[58] Field of Search ............... 123/585, 587, 568; 137/351

[56] References Cited

U.S. PATENT DOCUMENTS

| 2,152,028 | 3/1939 | Church | 123/587 |
| 4,100,900 | 7/1978 | Straub | 123/587 |
| 4,201,169 | 5/1980 | Michassouridis | 123/587 |
| 4,210,113 | 7/1980 | Heffernan | 123/587 |
| 4,287,866 | 9/1981 | Ikuta et al. | 123/568 |
| 4,325,349 | 4/1982 | Fehrenbach | 123/587 |
| 4,434,778 | 3/1984 | Morita et al. | 123/587 |
| 4,476,838 | 10/1984 | Fukumoto | 123/587 |
| 4,497,335 | 2/1985 | Masuda | 123/568 |
| 4,531,498 | 7/1985 | Bradshaw | 123/568 |

FOREIGN PATENT DOCUMENTS 1567601 5/1980 United Kingdom ............... 123/587

Primary Examiner—William A. Cuchlinski, Jr.

[57] ABSTRACT

A vacuum controller serving as a fuel saver includes a suction chamber communicated with a vacuum port of an engine carburetor and a plunger valve reciprocatively moved as actuated by the suction pressure in the suction chamber to control the air flow through a by-pass secondary air tube from an air filter towards a fuel inlet manifold for the complete combustion of fuel and for saving energy purpose.

3 Claims, 12 Drawing Figures

AIR-RICH FUEL SAVER

BACKGROUND OF THE INVENTION

In a conventional engine carburetor, the theoretical air fuel ratio generally ranges about 15:1-16:1. However, the actual air fuel ratio under different load conditions is exemplified as follows:

| LOAD | Air-Fuel Ratio |
| --- | --- |
| 1. Slow Non-load running | 11.8:1-12.8:1 |
| 2. Low load running | 13:1-14:1 |
| 3. Medium load running | 15:1-16:1 |
| 4. High load running | 12.5:1-13.8:1 |

In order to enhance the complete combustion of fuel and to reduce the pollutants such as: hydrocarbon, carbon monoxide and nitrogen oxide, due to incomplete combustion, excess air is added to the gas mixture to have an air-rich air fuel ratio ranging about 18:1-19:1.

A secondary air stream is thus added to the inlet manifold to dilute the gas mixture for saving fuel and for complete combustion, such as found in Ford (Cortina) or Honda (Civic) car. However, the secondary air conduit provided on the inlet manifold may only deliver an air stream of fixed quantity and can not variate the air quantity in response to the different gas quantity as added. Accordingly, such a secondary air system still can not provide a suitable air-fuel mixture for energy-saving purpose.

The present inventor has found the defects of a conventional car engine and invented the present air-rich fuel saver.

SUMMARY OF THE INVENTION

The object of the present invention is to provide a fuel saver which includes a vacuum controller having a vacuum chamber communicated with a vacuum port of a carburetor, an air inlet passage adapted for directing incoming air from an air filter, an air outlet passage for discharging the air into an inlet manifold of a car engine, and a plunger valve operatively actuated by the vacuum chamber to control the air flow delivered towards the inlet manifold in resposne to the different air fuel ratio under different running load conditions to thereby have more stable air-fuel ratio (18:1-19:1) with excess air supply for saving fuel and for preventing air pollution.

DETAILED DESCRIPTION

Figure 1:
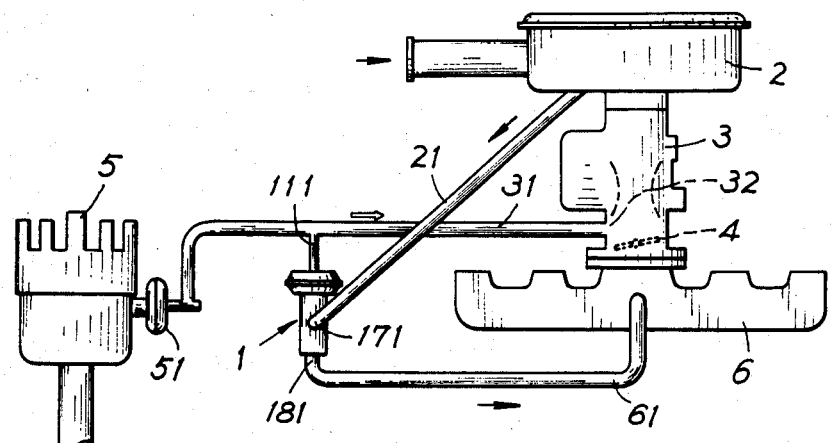
FIG. 1 is an illustration showing the application of the present invention.

As shown in FIGS. 1-5, the present invention includes a vacuum controller 1, serving as a fuel saver in an engine system, which comprises: a longitudinal casing 10 formed with a longitudinal hole 16 therein, a shallow cylindrical casing 11 defining a suction chamber 12 therein fixed on the right end of the casing 10, a plunger valve 15 reciprocatively moved in hole 16 having its right end fixed with a diaphragm 13 centrally provided in casing 11 and leftwards tensioned by a restoring spring 14 and having its left end formed as a valve head controlling the air flow thereby, an air inlet passage 17 formed on the side portion of casing 10 fluidically and perpendicularly communicated with the longitudinal hole 16, and an air outlet passage 18 communicated with the hole 16.

A vacuum connector 111 is formed on the right cover 11a to be communicated with a suction tube 31 which is connected between a vacuum advancer 51 of a distributor with vacuum-controlled spark adjustment 5 and a vacuum port 32 of a carburetor 3 positioned above throttle valve 4. There are provided with several venting holes 110 on the left cover 11b of casing 11.

The air inlet passage 17 includes a connector 171 for connecting a by-pass secondary air tube 21 fluidically communicated with the air filter 2. The air outlet passage 18 includes a connector 181 for connecting a discharge tube 61 connected with the fuel inlet manifold 6 of an engine (not shown).

An annular ring 16a having an inner hole 16b is embedded in the longitudinal hole 16 at the cross junction between the air inlet passage 17 and the hole 16. On the left end of the plunger valve 15, the valve head 15a is formed with a plug portion having a diameter 151 slightly smaller than the diameter 150 of the plunger 15 and a cone portion 152 operatively sealing the ring hole 16b, a first cylinder portion 153 protruding leftwards from the cone portion 152 and having a small diameter thereof, a second cylinder portion 154 terminated on the outermost end of valve head and having a medium-size diameter larger than that of the first cylinder 153 and a third cylinder portion 155 protruding leftwards from the first cylinder 153 and having a large diameter larger than that of the second cylinder 154.

Figures 3, 4, 5:
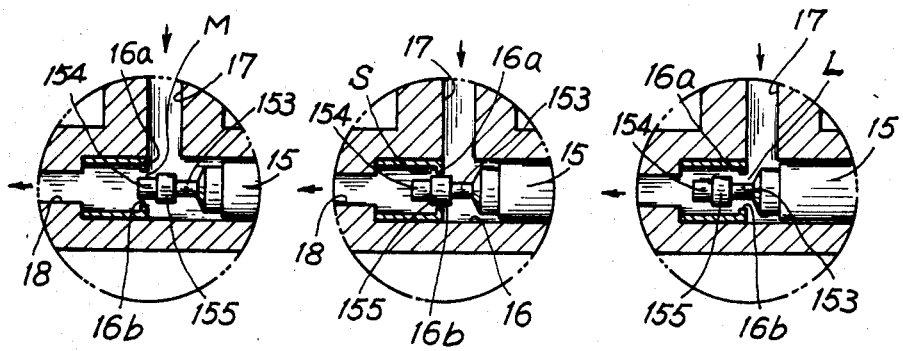
FIG. 3 is an illustration showing the control step of air flow under low-load engine running in accordance with the present invention.
FIG. 4 shows the control step under medium-load running condition.
FIG. 5 shows the step under high-load running condition.

The small annular hole S operatively defined between the third cylinder 155 and the annular ring 16a is the smallest hole (FIG. 4). The medium annular hole M operatively defined between the second cylinder 154 and annular ring 16a is larger than the annular hole S. The large annular hole L operatively defined between the ring 16a and the first cylinder 153 is the largest hole among the three annular holes.

Figure 2:
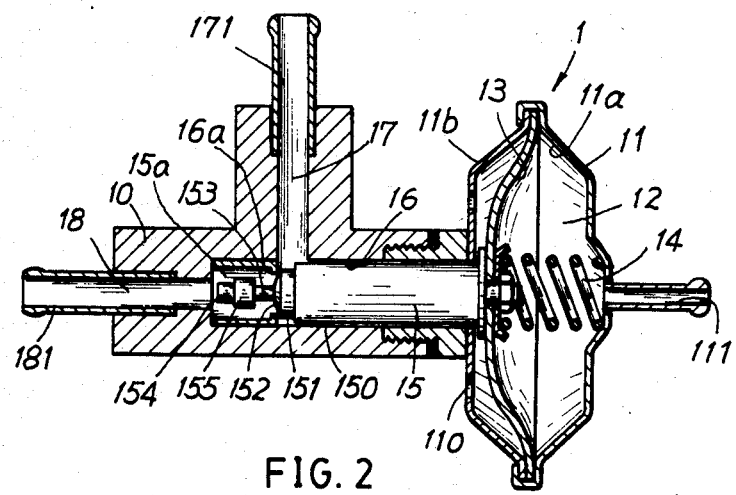
FIG. 2 is a sectional drawing of the present invention.

When an engine is runing at no-load slow speed, the throttle valve 4 is closed and no vacuum exerts at the Venturi tube in a curburetor 3 so that the restoring spring 14 will tension the diaphragm 13 leftwards as shown in FIG. 2 to push the plunger valve 15 leftwards through the hole 16 to thereby close the inner hole 16b to stop air flow from the secondary air tube 21, which will not influence the engine running and starting.

When the engine is under low load to have an air fuel ratio of 13:1–14:1, the suction force is the strongest by the venturi tube so that the diaphragm 13 of the vacuum controller 1 will be sucked through suction tube 31 towards the vacuum port 32 to move the plunger valve 15 rightwards to form a medium annular hole M as shown in FIG. 3, wherein the air stream is sucked from tube 21 by the suction force exerting at inlet manifold 6 at a medium quantity to make up the excess air for maintaining an air-rich air fuel ratio 18:1–19:1.

As shown in FIG. 4, the engine is under medium load running (air fuel ratio 15:1–16:1) to have a smaller suction force by the Venturi tube than that as shown in FIG. 3 to thereby allow the third cylinder 155 forming a small annular hole S with the annular ring 16a to limit the smallest air flow to maintain air fuel ratio 18:1–19:1.

When engine is at high-load running to have air fuel ratio of 12.5:1–13.8:1 (maximum fuel added), the vacuum suction is so weak to slightly suck the plunger valve 15 rightwards to form a larger annular hole L as shown in FIG. 5 to supply maximum air flow for ideal air fuel ratio 18:1–19:1.

Accordingly, the present invention can supply excess air in response to the different engine running conditions to obtain an ideal air fuel ratio for saving fuel and preventing air pollution as complete combustion of the fuel.

Figure 6:
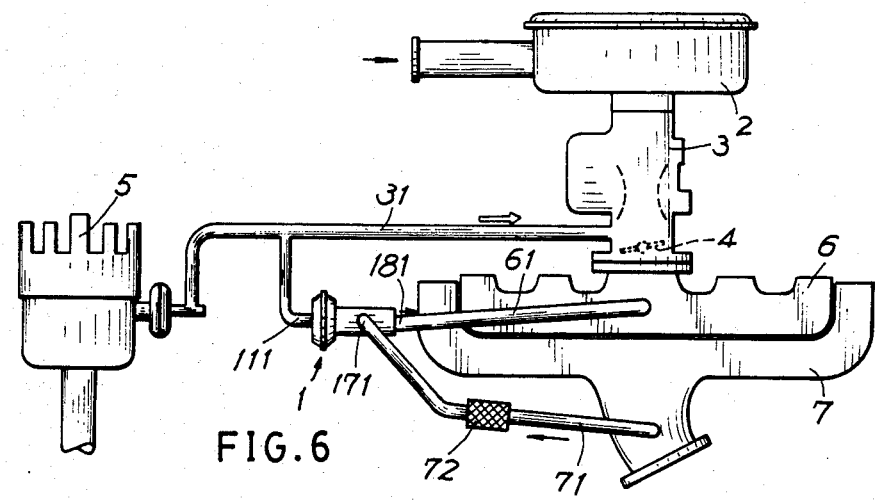
FIG. 6 shows the application of the present invention on an Exhaust-Gas-Recirculation (EGR) of an engine.

The present invention can also be applied in an Exhaust Gas Recirculation (EGR) system as shown in FIG. 6 wherein the exhaust gas emitted from an engine is sucked through an exhaust manifold 7, a gas tube 71 having a filter 72 thereon and the connector 171 to be directed into inlet manifold 6 through connector 181 and tube 61. The exhaust gas having gaseous products as incomplete combustion is recharged into inlet manifold 6 for further combustion to prevent air pollution.

As shown in FIGS. 7–11, another preferred embodiment of the present invention is modified from the aforementioned vacuum controller 1 to change the position of its partial elements.

Figure 8:
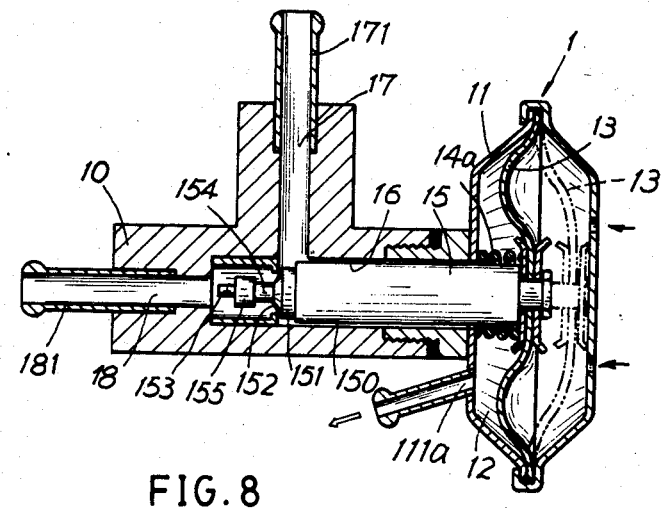
FIG. 8 is a sectional drawing of the present invention as shown in FIG. 7.

The vacuum controller 1 comprises: a cylindrical casing 11 fixed on the right side of the casing 10 having a diaphragm 13 fixed on the central portion of casing 11 as tensioned rightwards by a restoring spring 14a as shown in dotted line of FIG. 8, a vacuum connector 111a fluidically communicated with the inlet manifold 6 through a suction tube 31a, an air inlet passage 17 communicated with air filter 2, an air outlet passage 18 communicated with inlet manifold 6, a plunger valve 15 having a valve head including a cone portion 152 on the left side of valve 15, a first cylinder portion 153 having a smallest diameter terminated on the valve head, a second cylinder portion 154 protruding leftwards from the cone portion 152 having a medium-size diameter and a third cylinder portion 155 connected between the first cylinder 153 and the second cylinder 154 having a largest diameter.

As shown in FIG. 8, when the engine is at non-load slow running, the suction force from inlet manifold 6 is the strongest so that the diaphragm 13 will be sucked leftwards to move the plunger valve 15 leftwards to close the hole 16a to have the same effect as shown in FIG. 2.

Figure 9:
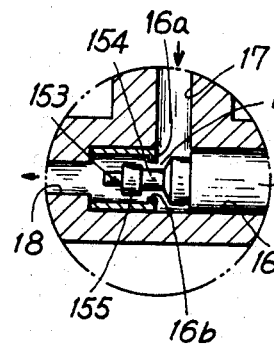
FIG. 9 shows the step under low-load condition of the present invention as shown in FIG. 7.

At low-load engine running as shown in FIG. 9, the suction by manifold 6 is weaker than that as shown in FIG. 8 and the plunger valve 15 is rightwards moved to form the medium-size annular hole M for air flow of medium quantity to be the same as shown in FIG. 3.

Figure 10:
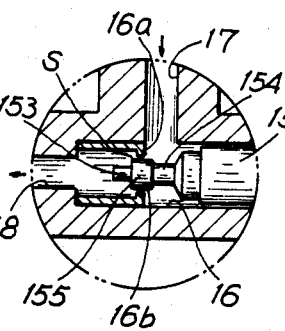
FIG. 10 shows the step under medium-load condition of the present invention.

At medium-load condition as shown in FIG. 10, the suction by manifold 6 is even weaker than that of FIG. 9 to thereby form a smallest hole S to supply very limited excess air to maintain the ideal air fuel ratio 18:1–19:1 (same as FIG. 4).

Figure 11:
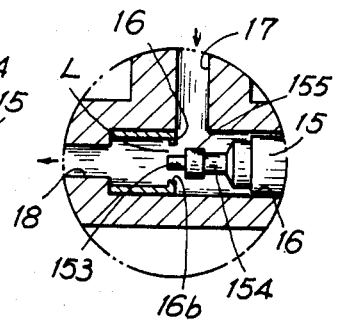
FIG. 11 shows the step under high-load condition of the present invention.

As shown in FIG. 11 at maximum load condition and the weakest suction by manifold 6, the valve 15 is moved rightward to form a largest annular hole L for supply maximum air to the engine manifold for complete combustion (same as FIG. 5).

Figure 7:
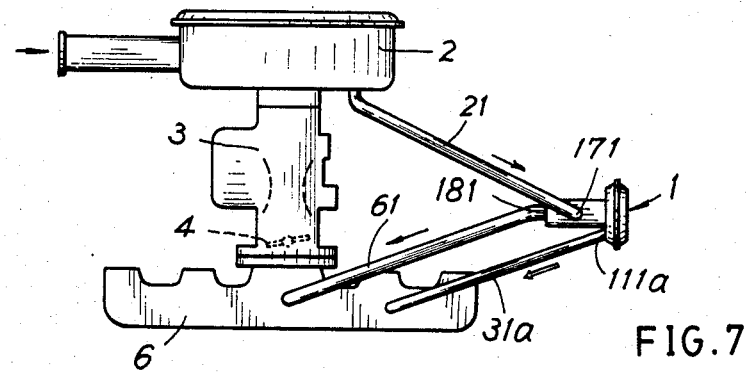
FIG. 7 shows another preferred embodiment of the present invention of which the valve is controlled by the inlet manifold.
Figure 12:
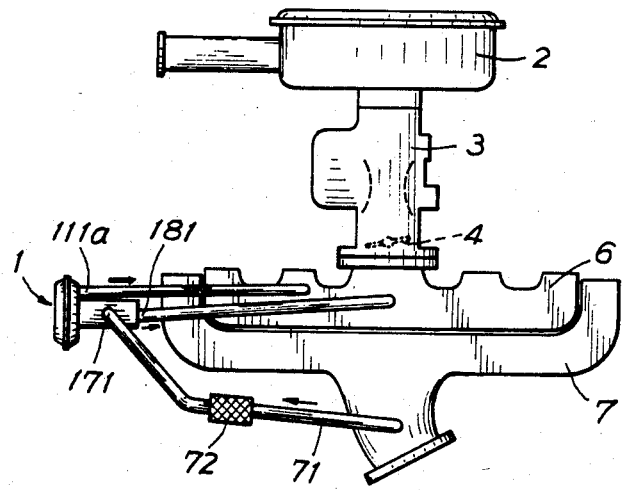
FIG. 12 shows another application of the present invention on an EGR system.

In FIG. 12, the exhaust gas may be recharged into vacuum controller 1 of FIGS. 7 and 8 for further combustion (same as FIG. 6 as aforementioned).

I claim:

1. An air-rich fuel saver including a vacuum controller comprising:

a longitudinal casing formed with a longitudinal hole therein having an air inlet passage perpendicularly and fluidically communicated with said longitudinal hole adapted to direct air therein from an air filter through a by-pass secondary air tube, and having an air outlet passage communicated with said longitudinal hole and fluidically connected to a fuel inlet manifold of an engine through an air discharge tube; a shallow cylindrical casing fixed on the right side of said longitudinal casing having a diaphragm formed on the central portion of said cylindrical casing and tensioned leftwards by a restoring spring, a vacuum connector fluidically communicated with a suction chamber defined by said diaphragm and said cylindrical casing, and connected towards a suction tube communicated between a vacuum port of a carburetor and a distributor with vacuum-controlled spark adjustment;

a plunger valve reciprocatively moved in said longitudinal hole having a valve head terminated on the left end thereof; and an annular ring embedded in said longitudinal hole at the junction of said air inlet passage and said longitudinal hole having an inner hole operatively forming an annular hole between said annular ring and said valve head to control the secondary air flow towards the inlet manifold;

the improvement which comprises:

said valve head of said plunger valve inluding: a cone portion formed on the left portion of said plunger valve operatively sealing said inner hole of said annular ring, a first cylinder portion protruding leftwards from said cone portion having a small diameter adapted to operatively from a large annular hole between said first cylinder and said annular ring, a second cylinder portion terminated on the left outermost end of said valve head having a medium-size diameter larger than that of said first cylinder adapted to form a medium annular hole between said annular ring and said second cylinder, and a third cylinder between said first and second cylinder portion having a large diameter to thereby form a small annular hole between said third cylinder and said annular ring.

2. A vacuum controller as claim 1 adapted for exhaust gas recirculation use having said secondary air tube connected with an exhaust manifold of an engine to thereby recharge the exhaust gas into inlet manifold for further combustion.

3. A vacuum controller serving as an air-rich fuel saver comprising:
- a longitudinal casing having a longitudinal hole therein and an air outlet passage communicated with said longitudinal hole and an air inlet passage perpendicularly communicated with said longitudinal hole;
- a shallow cylindrical casing fixed on the right side of said longitudinal casing having a diaphragm therein as tensioned rightwards by a restoring spring, and a vacuum connector communicated with a suction chamber defined between said diaphragm and said cylindrical casing, and a fuel inlet manifold; and
- a plunger valve terminated at its left outermost end with a first cylinder portion with a small diameter operatively forming a larger annular hole with an annular ring embedded in said longitudinal hole at the junction of said air inlet passage and said longitudinal hole, a second cylinder having a medium-size diameter protruding leftwards from a cone portion formed on the left portion of said valve operatively sealing said annular ring, and a third cylinder portion having a large diameter formed between said first and said second cylinder portion adapted to form a small annular hole with said annular ring.

* * * * *